Patented May 20, 1941

2,242,493

UNITED STATES PATENT OFFICE 2,242,493

PROCESS FOR THE PRODUCTION OF BERYLLIUM COMPOUNDS

Helmut von Zeppelin, Bitterfeld, Germany, assignor, by mesne assignments, to Walther H. Duisberg, New York, N. Y.

No Drawing. Application April 1, 1939, Serial No. 265,510. In Germany April 5, 1938

6 Claims. (Cl. 23—24)

This invention relates to a process for the production of beryllium compounds which are free from fluorine.

Minerals containing beryllium are usually decomposed by treatment with fluorine compounds, such as hydrofluoric acid or ammonium fluoride, yielding solutions containing the beryllium in the form of a fluoride. Since the production of metallic beryllium from such fluoride compounds is attended with difficulties, it is frequently preferable to produce the metal from an oxide or chloride of beryllium.

The present invention accordingly aims at converting the beryllium fluoride or beryllium double fluoride contained in such solutions, into beryllium oxide or beryllium chloride, while separating out the fluoride therefrom in the form of an insoluble compound.

To this end, according to the invention, solutions containing beryllium in the form of fluorine compounds are treated with a hydroxide of an alkaline earth metal, preferably calcium hydroxide, so as to convert the beryllium compounds into beryllium hydroxide and whereupon a beryllium compound is separated from the mixture of precipitates obtained by treating said mixture with a solution of a caustic alkali or with a solution of an alkali metal or ammonium carbonate.

The removal of the beryllium from the mixture of precipitates is preferably effected directly after precipitation, since, as is known, the freshly precipitated hydroxide soon becomes difficultly soluble by "ageing."

This inconvenience of "ageing" may also be avoided by converting the beryllium hydroxide of the mixture into beryllium chloride, by known methods for the preparation of beryllium chloride from beryllium compounds, at an elevated temperature in the presence of carbon, and thus causing the beryllium to volatilize, in the form of its chloride, the precipitated fluoride remaining as residue. In order to avoid the formation of hydrochloric acid with its consequent reaction on the fluoride to form volatile fluorine compounds, it is, however, necessary to previously calcine the mixture to be chlorinated, for a short period, at a temperature between 500° and 700° C., so as to convert the beryllium hydroxide into the oxide. The volatilized beryllium chloride produced in the manner hereinbefore set forth can be recovered in a practically pure form by condensation.

Example I

By the decomposition of a beryllium ore by means of sodium silico fluoride ($Na_2SiF_6$) there is obtained a solution of sodium-beryllium double fluoride which contains a quantity of beryllium corresponding to 5.25 grams per liter of BeO. To 10 liters of this solution, at a temperature of 50° C., are added 233 grams of calcium oxide, while stirring. After stirring for 20 minutes, carbon dioxide is passed through the solution, in order to convert any caustic soda formed by reaction with the calcium hydroxide, into sodium bicarbonate, whereupon 2000 grams of ammonium carbonate are added to the solution. After stirring for 30 minutes the whole is filtered and the residue obtained is washed with a solution of ammonium carbonate. On boiling the filtrate for about an hour, the beryllium separates out in the form of its basic carbonate. This carbonate contains 45.1 grams of beryllium oxide which corresponds to a yield of 85.8%, calculated on the beryllium oxide content of the initial material.

Example II 500 grams of a beryllium ore containing 58 grams of beryllium oxide are decomposed with 580 grams of sodium silico fluoride. The decomposition product is finely ground and then leached for two hours at 40° C. with 8 liters of water. 300 grams of calcium hydroxide are then added in the form of an aqueous suspension and the whole is stirred for a further period of 20 minutes at a temperature of 50° C. in order to complete the reaction. Carbon dioxide is then passed through the suspension in order to convert any caustic soda formed into sodium bicarbonate, which is particularly suitable for the subsequent recovery of the beryllium compound from the mixture. After adding 2000 grams of ammonium carbonate, stirring is continued for a further 20 minutes, after which the insoluble matter is separated by filtration. The insoluble matter mainly consists of the gangue i. e. silica and aluminium compounds and calcium fluoride. From the filtrate, basic beryllium carbonate is precipitated by boiling for about one hour. The quantity of beryllium carbonate obtained in this manner corresponds to 48.7 grams of beryllium oxide and thus represents a yield of 84% of beryllium oxide recovered in a commercially pure form.

I claim:

1. A process for the production of beryllium compounds which are free from fluorine, from an aqueous solution containing beryllium in the form of fluorine compounds, which comprises treating such solution with a hydroxide of an alkaline earth metal so as to precipitate a mixture of alkaline earth metal fluoride, beryllium hydroxide, and gangue, and thereupon separating the beryllium compound from such mixture of precipitates obtained by treating said mixture with a solution of at least one compound of the group consisting of the alkali metal hydroxides and the alkali metal and ammonium carbonates, so as to convert the beryllium hydroxide into solution, this solution being separated from the residue.

2. A process for the production of beryllium compounds which are free from fluorine, from an aqueous solution containing beryllium in the form of fluorine compounds, which comprises treating such solution with a hydroxide of an alkaline earth metal so as to precipitate a mixture of alkaline earth metal fluoride, beryllium hydroxide, and gangue, and separating the mixture of precipitates obtained from the residual solution and removing the beryllium compound from such mixture by treating such mixture with a solution of at least one compound of the group consisting of the alkali metal hydroxides and the alkali metal and ammonium carbonates, so as to convert the beryllium hydroxide into solution, this solution being separated from the residue.

3. A process for the production of beryllium compounds which are free from fluorine, from an aqueous solution containing beryllium in the form of fluorine compounds, which comprises treating such solution with calcium hydroxide so as to precipitate a mixture of calcium fluoride, beryllium hydroxide, and gangue, and thereupon separating the beryllium compound from such mixture of precipitates obtained by treating said mixture with a solution of at least one compound of the group consisting of the alkali metal hydroxides and the alkali metal and ammonium carbonates, so as to convert the beryllium hydroxide into solution, this solution being separated from the residue.

4. A process for the production of beryllium compounds which are free from fluorine, from an aqueous solution containing beryllium in the form of fluorine compounds, which comprises treating such solution with a hydroxide of an alkaline earth metal so as to precipitate a mixture of alkaline earth metal fluoride, beryllium hydroxide, and gangue, introducing carbon dioxide into the reaction mixture so as to neutralize any caustic soda formed in the reaction, separating the mixture of precipitates obtained from the residual solution and removing the beryllium compound from such mixture by treating such mixture with a solution of at least one compound of the group consisting of the alkali metal hydroxide and the alkali metal and ammonium carbonates, so as to convert the beryllium hydroxide into solution, this solution being separated from the residue.

5. A process for the production of beryllium compounds which are free from fluorine, from an aqueous solution containing beryllium in the form of fluorine compounds, which comprises treating such solution with a hydroxide of an alkaline earth metal so as to precipitate a mixture of alkaline earth metal fluoride, beryllium hydroxide, and gangue, and thereupon separating the beryllium compound from such mixture of precipitates obtained by treating said mixture with ammonium carbonate so as to re-dissolve beryllium compounds from the mixture of precipitates obtained, separating the solution from the remaining precipitate consisting of an alkaline earth metal fluoride and gangue, and boiling the filtrate so as to precipitate basic beryllium carbonate therefrom.

6. A process for the production of beryllium compounds which are free from fluorine, from an aqueous solution containing beryllium in the form of fluorine compounds, which comprises treating such solution with a hydroxide of an alkaline earth metal so as to precipitate a mixture of alkaline earth metal fluoride, beryllium hydroxide, and gangue, separating the mixture of precipitates obtained from the residual solution and removing the beryllium compounds from such mixture by treating such mixture with an ammonium carbonate solution so as to re-dissolve beryllium compounds from the mixture of precipitates obtained, separating the solution from the remaining precipitate consisting of an alkaline earth metal fluoride and gangue, and boiling the filtrate so as to precipitate basic beryllium carbonate therefrom.

HELMUT von ZEPPELIN.